(12) United States Patent
Espinoza et al.

(10) Patent No.: US 8,056,511 B1
(45) Date of Patent: Nov. 15, 2011

(54) ANIMAL CARRIER DEVICE

(76) Inventors: Jose C. Espinoza, Stockton, CA (US);
Maria Espinoza, Stockton, CA (US)

( * ) Notice: Subject to any disclaimer, the term of this patent is extended or adjusted under 35 U.S.C. 154(b) by 52 days.

(21) Appl. No.: 12/585,359

(22) Filed: Sep. 14, 2009

(51) Int. Cl.
*A01K 29/00* (2006.01)

(52) U.S. Cl. .......................... 119/496; 119/771

(58) Field of Classification Search ................. 119/496, 119/771, 453, 497; 297/256.16; D30/118
See application file for complete search history.

(56) References Cited

U.S. PATENT DOCUMENTS

| | | | |
|---|---|---|---|
| 4,512,286 A * | 4/1985 | Rux ............................. | 119/771 |
| 4,803,951 A | 2/1989 | Davis | |
| 4,915,446 A * | 4/1990 | Darling et al. ........... | 297/256.14 |
| 4,943,105 A | 7/1990 | Kacar et al. | |
| 5,005,526 A * | 4/1991 | Parker ........................ | 119/751 |
| 5,123,377 A * | 6/1992 | Edwards .................... | 119/28.5 |
| 5,133,294 A * | 7/1992 | Reid ............................ | 119/771 |
| D346,676 S | 5/1994 | Hopper, Jr. et al. | |
| 5,479,892 A * | 1/1996 | Edwards .................... | 119/771 |
| 5,533,785 A * | 7/1996 | Gould ........................ | 297/250.1 |
| 5,615,640 A | 4/1997 | Luiz | |
| 5,685,258 A * | 11/1997 | Fricano ..................... | 119/28.5 |
| 5,785,003 A * | 7/1998 | Jacobson et al. ......... | 119/496 |
| 5,810,227 A | 9/1998 | Jorgensen | |
| 5,832,874 A * | 11/1998 | Ravin ........................ | 119/496 |
| 5,941,195 A | 8/1999 | Martz | |
| 6,079,370 A * | 6/2000 | Al-Birmani et al. ....... | 119/771 |
| 6,155,206 A | 12/2000 | Godshaw | |
| 6,223,691 B1 | 5/2001 | Beattie | |
| 6,250,529 B1 | 6/2001 | Babbitt et al. | |
| 6,260,920 B1 * | 7/2001 | Tolfsen .................... | 297/256.16 |
| 6,539,895 B2 | 4/2003 | Hoagland | |
| 6,863,345 B2 * | 3/2005 | Kain ........................ | 297/256.16 |
| 7,036,458 B1 | 5/2006 | Stornant | |
| D528,706 S * | 9/2006 | Jefferson .................. | D30/108 |
| 7,152,554 B2 | 12/2006 | Crawford | |
| 7,383,789 B2 * | 6/2008 | Wilkes ..................... | 119/771 |
| 7,392,764 B2 | 7/2008 | Saavedra et al. | |
| 7,574,975 B2 * | 8/2009 | Kline ........................ | 119/28.5 |
| 7,628,120 B2 * | 12/2009 | Beeler ....................... | 119/496 |
| 7,770,970 B2 * | 8/2010 | Hei et al. ................. | 297/256.12 |
| 2005/0284399 A1 | 12/2005 | Asma | |
| 2006/0278173 A1 | 12/2006 | Kamijo | |
| 2008/0245311 A1 | 10/2008 | Kline | |
| 2008/0245313 A1 | 10/2008 | Jakubowski et al. | |
| 2009/0114688 A1 * | 5/2009 | Beeler ........................ | 224/416 |
| 2009/0199770 A1 * | 8/2009 | Jakubowski et al. ...... | 119/28.5 |
| 2009/0314219 A1 * | 12/2009 | Bryson ..................... | 119/496 |
| 2010/0139573 A1 * | 6/2010 | Wilson et al. ............ | 119/496 |

FOREIGN PATENT DOCUMENTS

WO   PCT/DE88/00215   9/1989

* cited by examiner

*Primary Examiner* — Yvonne R. Abbott
(74) *Attorney, Agent, or Firm* — Theodore J. Bielen, Jr.

(57) ABSTRACT

An animal carrier device used in conjunction with a vehicle occupant restraint and a vehicle seat. The device includes a base member having a bottom and a wall extending from the bottom. The wall includes a projection which extends further out than other portions of the wall from the base. The base also forms an open chamber. An enclosure fits into the open chamber and connects to the same through one or more latches, a flange is linked to the projection of the wall of the base member and interacts with the vehicle occupant restraint to confine the base member and the latch enclosure to the vehicle seat.

4 Claims, 3 Drawing Sheets

ANIMAL CARRIER DEVICE

BACKGROUND OF THE INVENTION

Animals must often be transported from place to place in vehicles. To prevent an animal from moving about and distracting the driver and occupants of the vehicle, cages have been developed that are hand carried to hold the animal during a vehicle trip or journey.

In the past, like apparatuses and systems have been proposed to transport animals in a vehicle. For example, U.S. Pat. Nos. 5,615,640, 6,539,895, US Patent Publication US2008/0245313, and U.S. Design Pat. No. 346,676 show pet and animal transportation carriers which are portable in that they are hand held and may be moved manually.

U.S. Pat. Nos. 6,155,206 and 7,036,458 describe animal travel carriers which include an enclosure and wheels that extend from the same to allow the carrier to roll on a surface.

U.S. Pat. No. 7,392,764 shows an animal restraint and carrier that is portable and includes an insert to carry medical supplies and other storage items.

United States Publication number US 2005/0284399 illustrates an animal enclosure which may be suspended to an upright arm with a cover that is movable between a stored position and a deployed position.

U.S. Pat. No. 4,943,105, US Patent Publication 2008/0245311, and PCT Application WO 89/08386 teach pet enclosures which are generally opened at the top and may be fitted on to a vehicle seat.

U.S. Pat. Nos. 5,810,227, 6,250,529, and 7,152,554 show animal carriers which may be affixed to the exterior of vehicles, including two-wheeled vehicles.

U.S. Pat. Nos. 4,803,951, 5,941,195, 6,223,691, and US Publication Number US 2006/0278173 describe enclosure for pets that may be placed on a vehicle seat and affixed to portions of the vehicle using a vehicle seatbelt.

An animal carrier which includes a portable enclosure and a protective base portion relative to a vehicle seat would be a notable advance in the art of animal husbandry.

BRIEF SUMMARY OF THE INVENTION

In accordance with the present invention a novel and useful animal carrier device is herein provided.

The device of the present invention is intended to be used with a vehicle occupant restraint, such as a seatbelt, and a vehicle seat. The device includes as one of its elements a base member. The base member possesses a bottom and an outwardly extending wall portion. The wall portion also includes a projection which extends further from the bottom of the base member and the remainder of the wall portion. The projection includes a first surface and an opposite second surface. The base member further includes an open chamber such that the projection first surface faces the open chamber.

An enclosure for an animal is also included in the present invention. The enclosure includes a bottom, a wall portion which extends from the bottom, and top connected to the wall portion. The enclosure further possesses a chamber for the animal and an opening communicating with the chamber. The enclosure is sized to lie within the open chamber of the base member. One latch removably holds the enclosure to the base member lying in the open chamber. In certain cases, a second or another latch may be employed for the same purpose. The second latch lies at an angular orientation relative to the first latch to stabilize the enclosure lying within the open chamber of the base member.

A flange is also provided in the present invention and is linked to the second surface of the projection of the wall portion extending from the base member. The flange interacts with the vehicle occupant restraint to confine the base member to the vehicle seat. The flange may take the form of a ring or other suitable shape to achieve this result.

The wall portion of the base member may be formed with a gap. Likewise, the enclosure may include a door at the opening to the enclosure chamber such that the door passes through the base member gap in its operation.

It may be apparent that a novel and useful animal carrier device has been herein above described.

It is therefore an object of the present invention to provide an animal carrier device which useable on a vehicle seat and is easily integrated with a restraint or safety strap system of a vehicle.

Another object of the present invention is to provide an animal carrier device which possesses an enclosure for the animal which is portable and is simply positioned within an open chamber of the base member, linked to the safety restraint system of a vehicle.

A further object of the present invention is to provide an animal carrier device in which a base member having an open chamber is used with an enclosure to protect the vehicle seat from effluents emanating from the enclosure.

Another object of the present invention is to provide an animal carrier device which utilizes a protective base member in conjunction with multiple enclosures which are interchangeable with one another relative to the base member.

Yet another object of the present invention is to provide an animal carrier device which is easily manufactured and durable in its construction.

The invention possesses other objects and advantages especially as concerns particular characteristics and features thereof which will become apparent as the specification continues.

For a better understanding of the invention reference is made to the following detailed description of the preferred embodiments of the invention which should be taken in conjunction with the above described drawings.

DETAILED DESCRIPTION OF THE PREFERRED EMBODIMENTS OF THE INVENTION

Various aspects of the present invention will evolve from the following detailed description of the preferred embodiments thereof which should be referenced to the prior described drawings.

Figure 2:
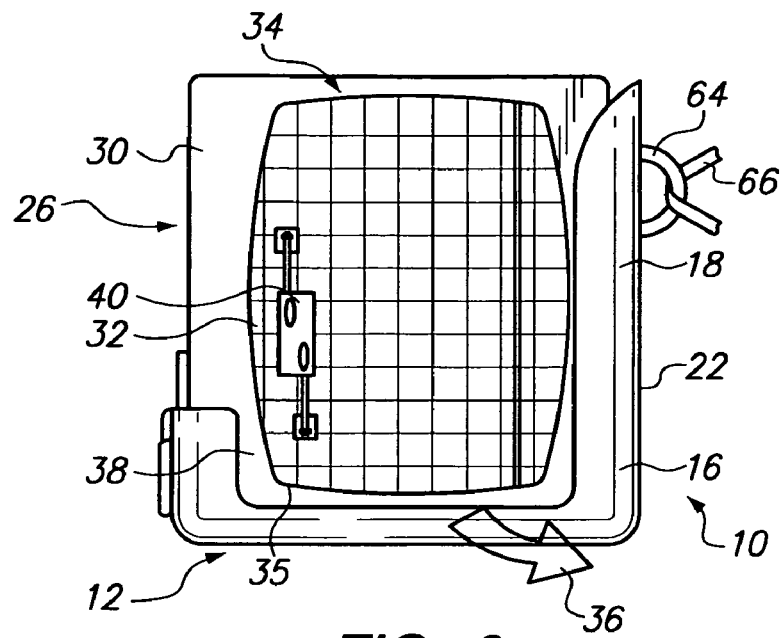
FIG. 2 is a right side elevational view of the animal carrier device of the present invention.
Figure 3:
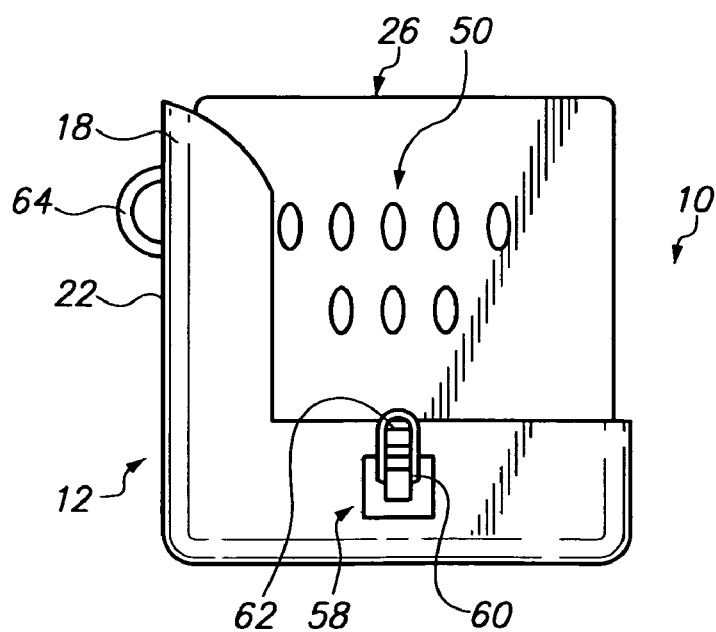
FIG. 3 is a left side elevational view of the animal carrier device of the present invention.

An embodiment of the device of the present invention as a whole is depicted in the drawings by reference character 10. The animal carrier device 10 includes as one of its elements a base member 12. Base member 12 possesses a bottom 14 with an outwardly extending wall portion 16. Wall portion 16 extends around bottom 14 and includes a projection 18. Projection 18 extends outwardly further from bottom 14 and the remainder of wall portion 16. In this regard, projection 18 possesses a first surface 20 and an opposite second surface 22, FIGS. 1-3. Base member 12 also forms an open chamber 24, shown in broken away format in FIGS. 1 and 4. First surface 20 of projection 18 faces open chamber 24 while second surface 22 faces outwardly and forms an outer surface of base member 12.

Figure 1:
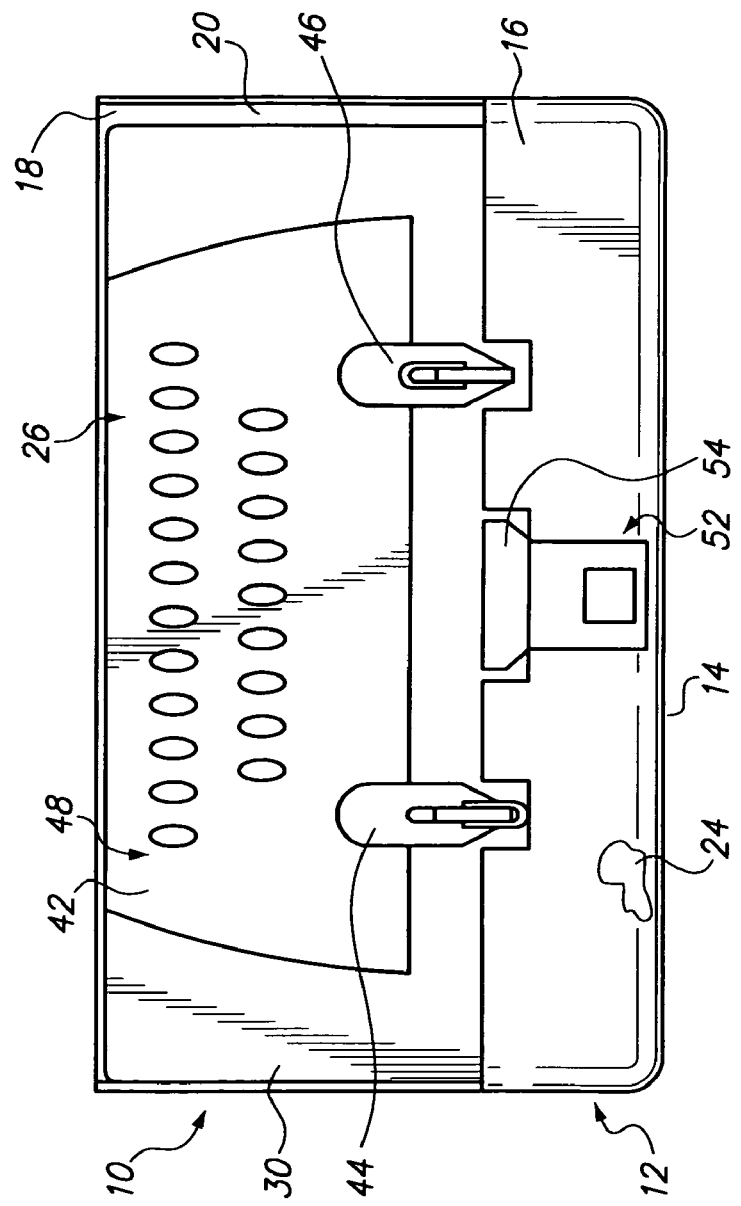
FIG. 1 is a front elevational view of the device of the present invention.
Figure 4:
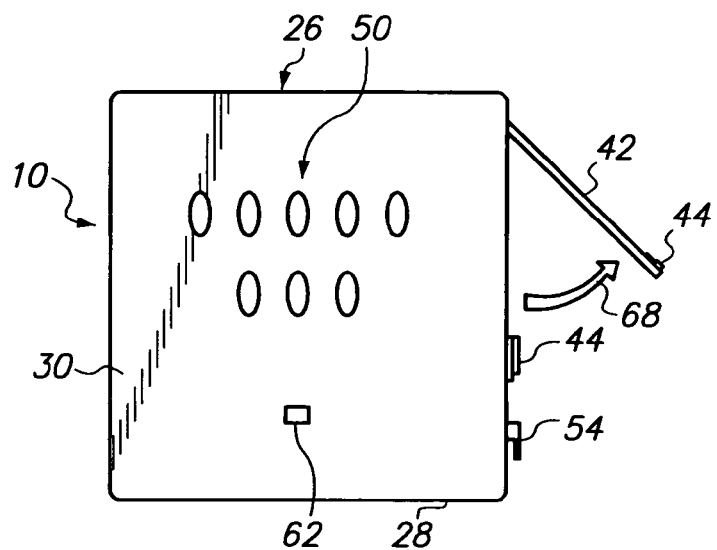
FIG. 4 is an exploded view showing the relation between the enclosure and the base member of the present invention.
Figure 4:
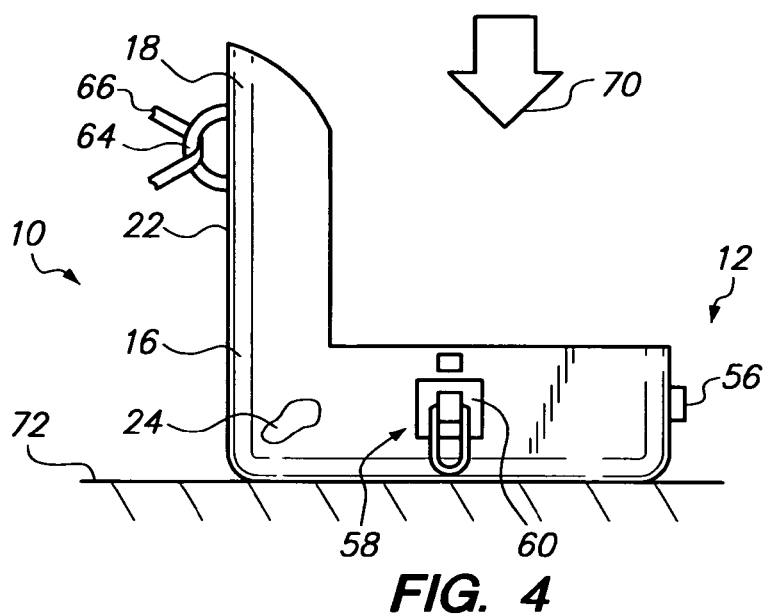

An enclosure 26 is also included as a portion as device 10. Enclosure 26 is intended to confine an animal and is formed with a bottom 28 and a wall portion 30 extending therefrom. Enclosure also includes a closed chamber 32 for this purpose, FIGS. 2 and 4. In addition, enclosure 26 possesses a door 34 in an opening 35 which swings outwardly as desired according to directional arrow 36, FIG. 2. Wall portion 16 of base member 12 is provided with a gap 38 to allow door 34 to move inwardly and outwardly relative to base member 12. A lock 40 may maintain door 34 in a closed condition, FIG. 2. Generally, enclosure 26 is of a conventional configuration in this regard. Further, enclosure 26 possesses an upwardly extending door 42 which is located approximately 90 degrees around the perimeter of enclosure 26 from door 34. Clasps 44 and 46 control the opening and closing of the door 42, as shown in FIGS. 1 and 4. A plurality of apertures 48 and 50 of FIGS. 1, 3, and 4, allow ventilation in chamber 32 of enclosure 26.

A first latch 52 holds enclosure 26 to base member 12. Latch 52 include a tongue 54 connected to enclosure 26 which mates with a receiver 56 held to base 12, FIGS. 1 and 4. Likewise, another latch 58 holds enclosure 26 to base member 12 by the use of a rotatable loop 60 which engages a protuberance 62 fixed to wall portion 30 of enclosure 26. It should be noted that latch 58 is located approximately 90 degrees from latch 52. This angle of separation between latch 52 and latch 58 adds to the security of the positioning of enclosure 26 within open chamber 24 of base 12.

Device 10 is also formed with a flange 64 in the form of a ring. Flange is fixed to second surface 22 of projection 18 of base member 12. Flange 64 is intended to engage a seatbelt 66 or other vehicle occupant restraining means 66 which will be discussed in greater detail as the specification continues.

In operation, the user device 10 places enclosure 26 within open chamber 24 of base member 12. Wall portion 16 of base member 12 allows the opening of door 42, directional arrow 68 of FIG. 4. Also, door 34 is free to open relative to base member, directional arrow 36 of FIG. 2, by the formation of gap 38 in wall portion 16 of base member 12. Most importantly, enclosure 26 is securely held by base member 12 by the use of latch 52 formed by the mating of tongue 54 and receiver 56, as well as latch 58 which operates by the engagement of loop 60 with protuberance 62 on wall portion 30 of enclosure 26. Once enclosure 26 is placed within open chamber 24 of base member 12, directional arrow 70 of FIG. 4, device 10 is secured to vehicle seat surface 72. Such securing takes place by the interaction of seatbelt restraint 66 and loop flange 64 connected to second surface 22 of projection 18 of base member 12, FIGS. 1-4.

While in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. An animal carrier device utilized with a vehicle occupant restraint and a vehicle seat, comprising:
 a. a base member, said base member comprising a bottom and an outwardly extending wall portion therefrom, said wall portion including a projection lying outwardly from said bottom, a greater distance than the remainder of said wall portion, said projection including a first surface and an opposite second surface, said base member further comprising an open chamber, said first surface of said projection facing said open chamber;
 b. an enclosure for an animal, said enclosure including a bottom, a wall portion extending from said bottom, and a top connected to said wall portion, said enclosure further comprising a chamber, said enclosure including an opening communicating with said chamber, said enclosure lying within said open chamber of said base member;
 c. one latch, said latch removably holding said enclosure to said base member lying in said open chamber, and
 d. flange linked to said second surface of said projection of said wall portion of said base member said flange interacting with the vehicle occupant restraint to confine said base member to the vehicle seat; and
 e. Another latch removably holding said enclosure to said base member, said another latch angularly positioned relative to said one latch.

2. The device of claim 1 in which said flange comprises a ring.

3. The device of claim 1 which further comprises a gap in said remainder of said wall portion.

4. The device of claim 1 which said enclosure further includes a door, said door passing through said gap in said remainder of said wall portion.

* * * * *